(No Model.)
H. BORSCH.
OPERA GLASS HOLDER.
No. 395,946. Patented Jan. 8, 1889.
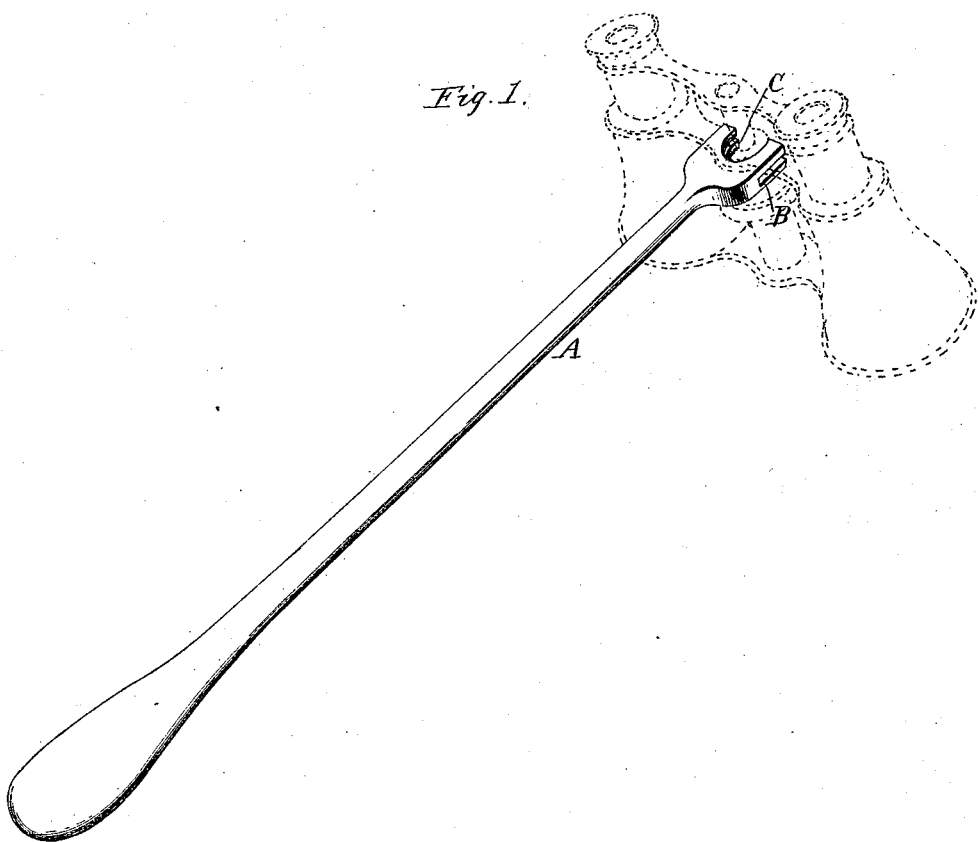
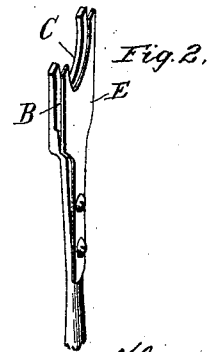
WITNESSES:
C. H. Raeder.
E. H. Bond.
INVENTOR,
Henry Borsch
BY T. J. W. Robertson
ATTORNEY.

UNITED STATES PATENT OFFICE.

HENRY BORSCH, OF CHICAGO, ILLINOIS.

OPERA-GLASS HOLDER.

SPECIFICATION forming part of Letters Patent No. 395,946, dated January 8, 1889.

Application filed March 29, 1888. Serial No. 268,823. (No model.)

*To all whom it may concern:*

Be it known that I, HENRY BORSCH, a citizen of the United States, residing at Chicago, in the county of Cook and State of Illinois, have invented certain new and useful Improvements in Opera-Glass Holders, of which the following is a specification, reference being had therein to the accompanying drawings.

This improvement relates to holders for opera-glasses and the like; and the invention consists in the peculiar construction, arrangement, and combination of parts hereinafter more particularly described, and then definitely claimed.

In the accompanying drawings, Figure 1 is a perspective view of my holder with the opera-glass in dotted lines. Fig. 2 shows a modification of the holder shown in Fig. 1.

Referring now to the details of the drawings by letter, A represents the holder in its plainest form, and is provided with a slot, B, adapted to receive and hold one of the cross-bars of the opera-glass, and a curved notch, C, to receive the revolving nut of the same. With this construction an opera-glass may be readily attached to the holder and as readily removed, and when attached to the glass the latter may be held to the eyes of the user without the necessity of raising the arm to the fatiguing position required with the ordinary opera-glass.

Instead of making both sides of the holder rigid, as shown in Fig. 1, I may make one side rigid and the other of spring metal, as shown at E in Fig. 2.

What I claim as new is—

A detachable opera-glass holder provided with slots at right angles to each other, forming a four-pronged clasp adapted to embrace the opposite sides of the cross-bar and to receive the nut on one side of said bar and the spindle or screw on the other, substantially as described.

In testimony whereof I affix my signature, in presence of two witnesses, this 27th day of March, 1888.

HENRY BORSCH.

Witnesses:
T. J. W. ROBERTSON,
M. P. CALLAN.